(12) United States Patent
Ricard (10) Patent No.: US 7,760,405 B2
(45) Date of Patent: Jul. 20, 2010

(54) APPARATUS AND METHOD FOR INTEGRATING PRINT PREVIEW WITH DATA MODELING DOCUMENT EDITING

(75) Inventor: Christophe Guy Ricard, L'Haÿ-les-Roses (FR)

(73) Assignee: Business Objects Software Ltd, Dublin (IE)

( * ) Notice: Subject to any disclaimer, the term of this patent is extended or adjusted under 35 U.S.C. 154(b) by 358 days.

(21) Appl. No.: 11/848,141

(22) Filed: Aug. 30, 2007

(65) Prior Publication Data

US 2009/0059305 A1  Mar. 5, 2009

(51) Int. Cl.
 H04N 1/46 (2006.01)
 G06F 15/00 (2006.01)
 G06K 9/03 (2006.01)

(52) U.S. Cl. .............. 358/517; 358/1.12; 358/1.16; 382/309

(58) Field of Classification Search ........... 358/1.13, 358/1.1, 1.2, 3.23, 3.31, 1.12, 1.17, 537, 358/540, 501, 1.16, 1.9, 1.4, 1.6, 527, 539; 382/309
See application file for complete search history.

(56) References Cited

U.S. PATENT DOCUMENTS

| | | | |
|---|---|---|---|
| 6,785,667 B2 * | 8/2004 | Orbanes et al. ............ 1/1 |
| 6,945,645 B2 * | 9/2005 | Baron .................... 347/104 |
| 7,107,285 B2 * | 9/2006 | von Kaenel et al. .......... 1/1 |
| 7,277,572 B2 * | 10/2007 | MacInnes et al. ......... 382/154 |
| 7,433,885 B2 * | 10/2008 | Jones ...................... 1/1 |
| 2006/0288304 A1 * | 12/2006 | Nomoto et al. ........... 715/781 |
| 2008/0180701 A1 * | 7/2008 | Nakagiri et al. ........... 358/1.9 |
| 2009/0122341 A1 * | 5/2009 | Natori .................... 358/1.15 |
| 2009/0217195 A1 * | 8/2009 | Nakabayashi et al. ..... 715/788 |

OTHER PUBLICATIONS

MAXIMUMpcguides: "Internet Explorer Printing," [online], Brent Trahan 2006-2007, 6 pages, [retrieved on Aug. 23, 2007]. Retrieved from the Internet: URL: http://www.maximumpcguides.com/internet-explorer-printing/.
Microsoft, "About ways to view a Word document," Microsoft Office Word 2003 Help, 1 page.

\* cited by examiner

Primary Examiner—Madeleine A Nguyen
(74) Attorney, Agent, or Firm—Cooley LLP (57) ABSTRACT

A computer readable storage medium includes executable instructions to supply, in an editor mode, a first set of data modeling objects in a document. A user request to enter a print preview mode is accepted. The print preview mode is entered while the editor mode remains active. The document is applied to a page layout with a set of pages. A set of pages to print are specified, where individual pages in the set of pages to print contain a subset of data modeling objects in the first set of data modeling objects.

18 Claims, 6 Drawing Sheets

APPARATUS AND METHOD FOR INTEGRATING PRINT PREVIEW WITH DATA MODELING DOCUMENT EDITING

BRIEF DESCRIPTION OF THE INVENTION

This invention relates generally to data modeling. More particularly, this invention relates to integrating a print preview feature into a data modeling document editor.

BACKGROUND OF THE INVENTION

The process of setting print parameters is often an independent and/or linear workflow. Thus, a user sets all their desired print parameters before seeing the result of the settings in a print preview mode. Viewing the setting results often requires waiting until the end of the workflow or leaving the print preview workflow altogether. This can make setting print parameters a laboriously iterative process. Furthermore, it can make selecting the correct pages to print difficult as the user is required to remember which pages are relevant.

In view of the foregoing, it would be beneficial to provide a product that allows users to work within a print preview mode and editor mode simultaneously where all print parameters can be altered and the page layout is updated on-the-fly. Additionally, it would be beneficial to add page selection automation. These features would be particularly useful in data modeling which is an important aspect of Business Intelligence.

Business Intelligence (BI) generally refers to a category of software systems and applications used to improve business enterprise decision-making and governance. These software tools provide techniques for analyzing and leveraging enterprise applications and data. These tools are commonly applied to financial, human resource, marketing, sales, service provision, customer and supplier analyses. More specifically, these tools can include: reporting and analysis tools to analyze, forecast and present information, content delivery infrastructure systems for delivery, storage and management of reports and analytics, data warehousing systems for cleansing and consolidating information from disparate sources, and integration tools to analyze and generate workflows based on enterprise systems. Business Intelligence tools work with data management systems, such as relational databases or On Line Analytic Processing (OLAP) systems used to collect, store, and manage raw data and transactional enterprise systems that generate data. A subset of business intelligence tools are reports, OLAP, EIM, ETL, Dashboard and Analytics.

SUMMARY OF INVENTION

The invention includes a computer readable storage medium with executable instructions to supply, in an editor mode, a first set of data modeling objects in a document. A user request to enter a print preview mode is accepted. The print preview mode is entered while the editor mode remains active. The document is applied to a page layout with a set of pages. A set of pages to print are specified, where individual pages in the set of pages to print contain a subset of data modeling objects in the first set of data modeling objects.

The invention also includes a computer readable storage medium with executable instructions to accept a user request to enter a print preview mode. The print preview mode is entered while maintaining an active editor mode. A document is applied to a page layout with a set of pages. A user alteration to a print ratio is accepted. The page layout is updated.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The following terminology is used while disclosing embodiments of the invention:

A data modeling document is a file containing an image of a set of one or more data modeling objects. A data modeling document generally illustrates the relationship between the data modeling objects. This relationship could illustrate a schema, a transform, a mapping, a query and the like.

A data modeling object is an entity related to structured data. Examples of data modeling objects are a table, a view, a comment, a link, a column, a row, a key, a data source, a cube, a measure, an attribute, a dimension, a filter, a transform, a logging point, a mapping link, a data flow, an abstraction layer, a data target, a rule, a user, a user group, a stored procedure and the like.

Page-to-page ratio is the number of pages of a document that will be printed on one side of a single sheet of paper.

Print parameters are specifications that define how a document or a portion of a document will appear on a printed page. Print parameters include page orientation, print ratio, page-to-page ratio, pages to print, number of copies, printer, paper size, how many sides to print on and the like.

Print ratio is a value representing the change in scale between the unit size of a data modeling object and the unit size of a page in the page layout of an electronic document. This is in contrast with a page-to-page ratio which represents the area that a page in the page layout of an electronic document covers on a sheet of paper when printed. Print ratios can be expressed using a number of metaphors including fit to page dimensions, percentage mappings and the like. Print ratios can be expressed using a number of metaphors including fit to page dimensions, percentage mappings and the like.

Figure 1:
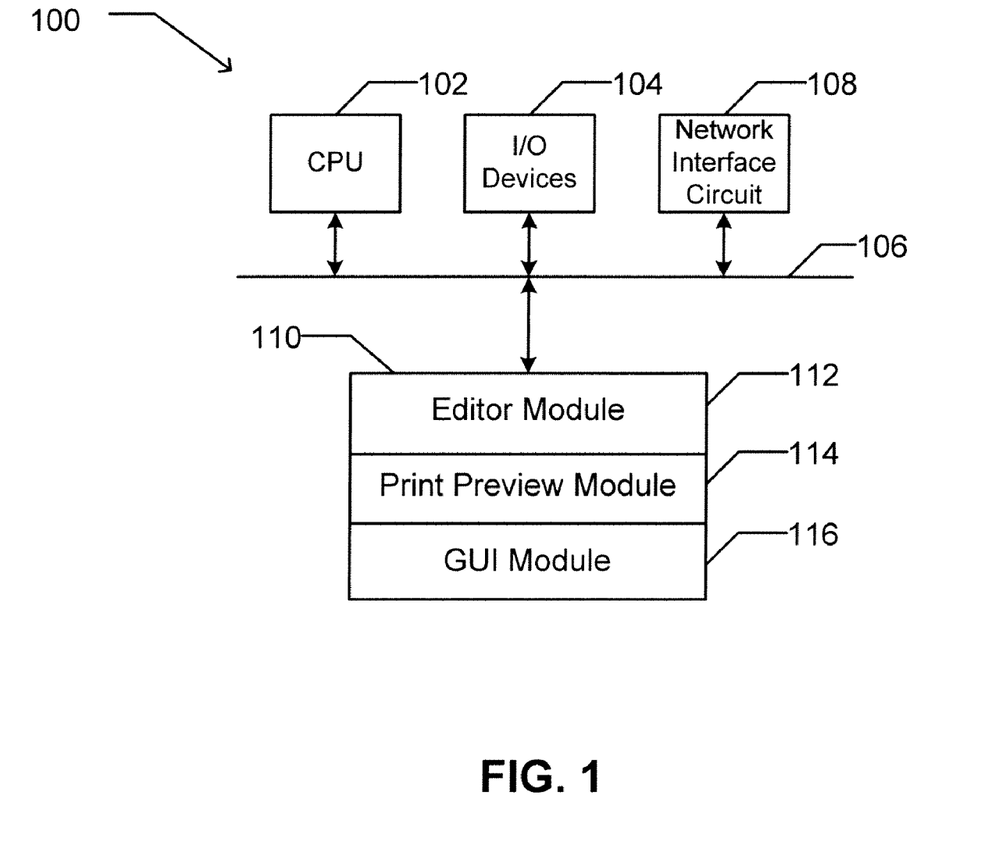
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit (NIC) 108 provides connectivity to a network (not shown), thereby allowing the computer 100 to operate in a networked environment.

A memory 110 is also connected to the bus 106. In an embodiment, the memory 110 stores one or more of the following modules: an editor module 112, a print preview module 114, and a Graphical User Interface (GUI) module 116.

The editor module 112 accepts and stores alterations to a data modeling document. The print preview module 114 accepts and stores alterations to print parameters, determines and displays the page layout for printing, and generates an overview page. The GUI module 116 may rely upon standard techniques to produce graphical components of a user interface, e.g., windows, icons, buttons, menu and the like, examples of which are discussed below.

The executable modules stored in memory 110 are exemplary. Additional modules such as an operating system module may be included. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
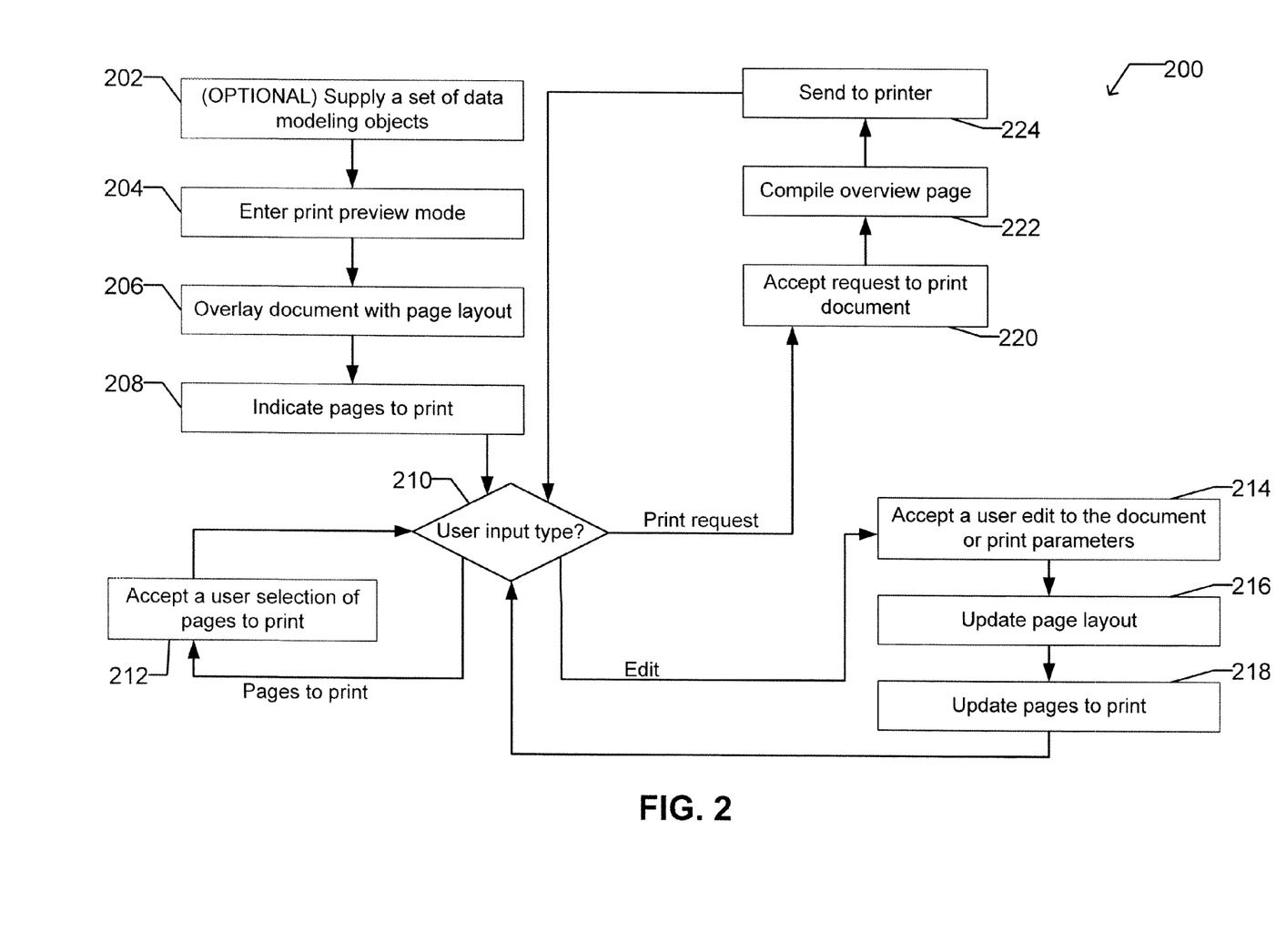
FIG. 2 illustrates processing operations associated with an embodiment of the invention.

FIG. 2 illustrates a high level workflow 200 associated with an embodiment of the invention. In an embodiment, the requirements for entering this workflow are that a data modeling document is open in an editor mode. In an embodiment, before entering print preview mode, a set of data modeling objects are supplied 202. This set may be selected by the user selecting each data modeling object individually via the GUI module 116. Alternately, a rule selects a set of data modeling objects with one or more common properties. These properties may include one or more of object type, name, data source, value, relationship and the like. An example rule is "select tables with name containing 'Payroll' from data source 'Finance'".

The user then enters the print preview mode 204, wherein the editor mode remains active; the user can edit the document at any time while in print preview mode. In an embodiment, a print preview toolbar is displayed, which allows the user to alter all print parameters. The print preview module 114 then determines the page layout and overlays the document with it 206. The page layout indicates what document content will be printed on each page by displaying the page boundaries. In an embodiment, the page layout contains the fewest number of pages required to form a rectangle of pages that overlays all of the document content. Then the print preview module 114 indicates the pages to print 208. In an embodiment, the pages to print are determined based on previously selected data modeling objects. If a set of data modeling objects has been selected, the pages overlapping the selected data modeling objects are selected for printing. If no data modeling objects have been selected, then any page overlapping a data modeling object is selected for printing. In an embodiment, the print preview module indicates the set of pages to print by highlighting each page to print using a technique selected from one or more of bolding the page boundaries, shading the area within the page boundaries, and the like.

The print preview module 114 waits to receive user input via the GUI module 116 210. In an embodiment, the user input is selected from an alteration to the document or the print parameters 210—Edit, a selection of the pages to print 210—Pages to print, and a request to print the document 210—Print request.

If the user input is a selection of pages to print, 210—Pages to print, then the print preview module accepts the page selection 212 and waits for another user input 210. In an embodiment, the page selection is indicated by specifying the desired page numbers. In an embodiment, the page selection is indicated by clicking on the desired pages within the page layout. In an embodiment, if a set of data modeling objects has been selected and the user selects additional pages, the data modeling objects on the additional pages are added to the set of selected data modeling objects. Conversely, if a set of data modeling objects has been selected and the user deselects pages, the data modeling objects on the deselected pages are removed from the set of selected data modeling objects.

If the user input is an alteration to the document or the print parameters, 210—Edit, then one or both of the editor module 112 and the print preview module 114 is involved. If the input is a document alteration, the editor module 112 accepts the user input and updates the document 214. If the input is a print parameter alteration, the print preview module 114 accepts the user input and updates the print parameters 214. The print preview module 114 then updates the page layout 216 and the pages to print 218, and waits for another user input 210.

If the input is a print request, 210—Print request, the print preview module 114 accepts the print request 220 and compiles an overview page 222. In an embodiment, the overview page comprises summary data for the document (i.e., title, author, creation date, description, number of pages, selection rule definition and the like) and an image of the page layout indicating how the pages relate to one another. The print preview module 114 then sends the document and overview page to the specified printer 224 and waits for another user input 210.

Figure 3:
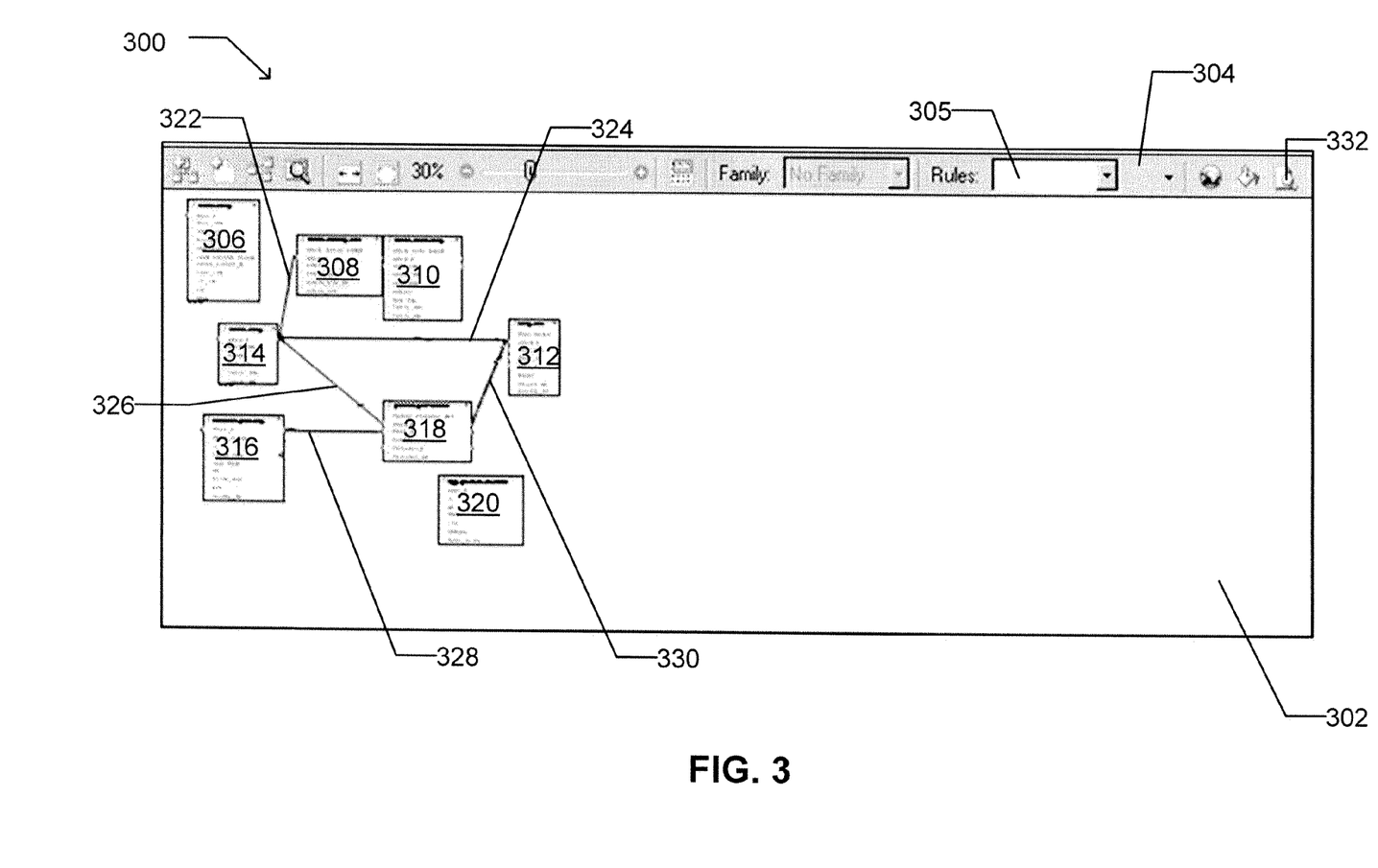
FIG. 3 illustrates a data modeling document in an editor mode configured in accordance with an embodiment of the invention.

FIG. 3 illustrates a GUI 300 in editor mode configured in accordance with an embodiment of the invention. The GUI 300 comprises a data modeling workspace 302 and a toolbar 304. In an embodiment, the toolbar 304 contains a "Rules" widget 305 used to select sets of data modeling objects. Rules specify properties common to the data modeling objects desired for selection, including but not limited to name, type, size, data source and value. In an embodiment, a rule can be used to select a set of data modeling objects at any time before or after entering print preview mode. In an embodiment, if a set of data modeling objects has been selected, they are the only data modeling objects that will be printed. The tables 306-320 and table links 322-330 comprise a data modeling diagram constructed in accordance with an embodiment of the invention. In an embodiment, the print preview mode can be activated by clicking a print preview button 332.

Figure 4:
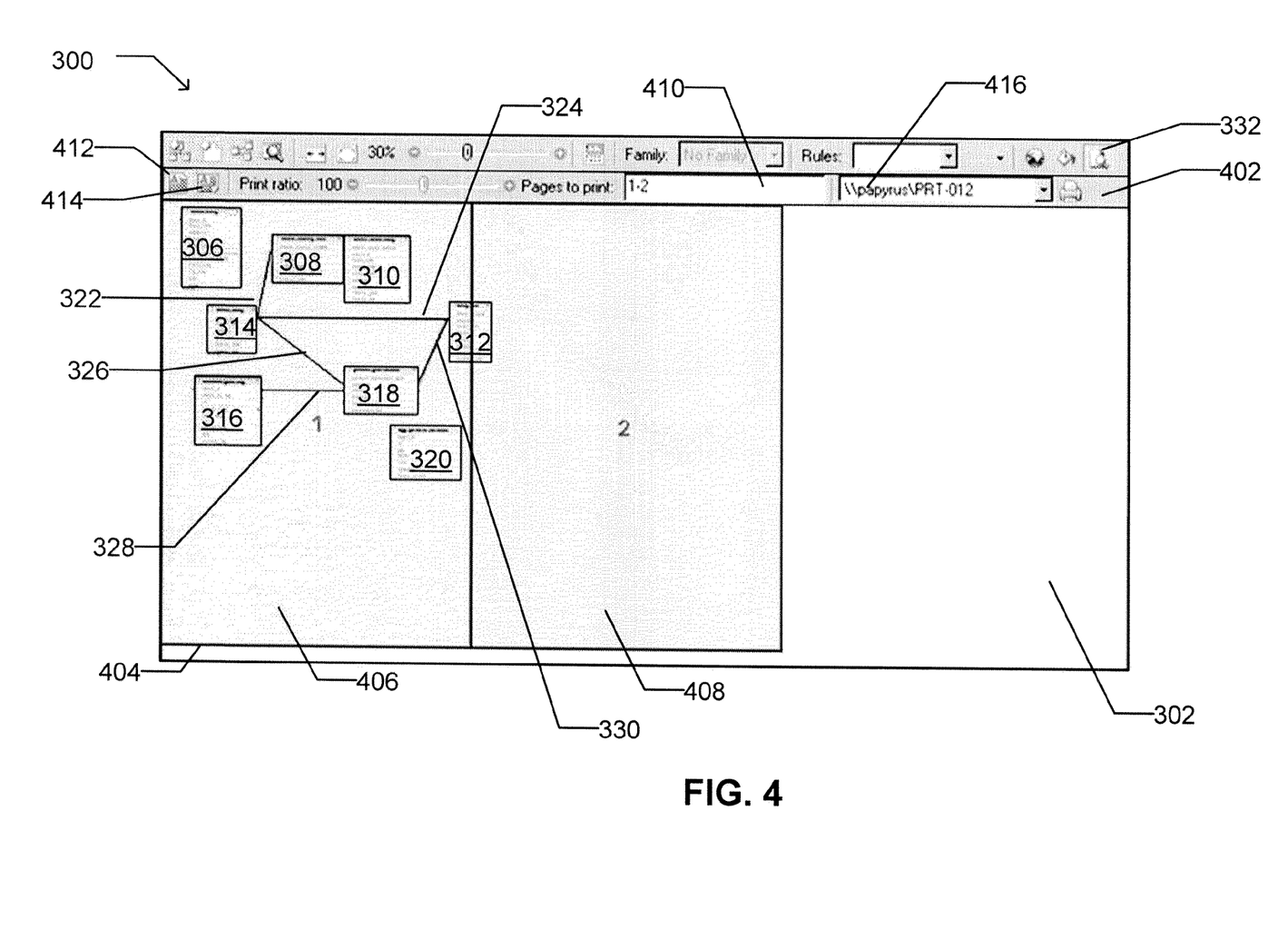
FIG. 4 illustrates a data modeling document in a print preview mode configured in accordance with an embodiment of the invention.

FIG. 4 illustrates the GUI 300 of FIG. 3 in print preview mode configured in accordance with an embodiment of the invention. In an embodiment, the print preview button 332 is depressed when in print preview mode. In an embodiment, entering the print preview mode produces a print preview toolbar 402 providing buttons, text boxes, sliders and the like for editing print parameters. The page layout 404 illustrates the pages 406 and 408 required to print the data modeling objects 306-330. In an embodiment, the toolbar 402 contains a "Pages to print" textbox 410 which displays the numbers of the pages currently selected for printing. In an embodiment, the textbox 410 can also be used to specify pages to print. In the example, the page 1 406 and page 2 408 are selected for printing as indicated by their dark grey hue in comparison with the rest of the data modeling workspace 302. The "Pages to print" textbox 410 indicates the page selection. In an embodiment, the print preview toolbar 402 also contains page orientation buttons 412 and 414. The current page layout is in a portrait orientation as indicated by the depressed portrait page orientation button 412. The page orientation can be changed to landscape orientation by clicking the landscape page orientation button 414. In an embodiment, the print preview toolbar 402 contains a dropdown printer selection list 416 to indicate which printer is to be used. The page layout 404 is calculated in accordance with printer specific specifications such as required minimum margin width, paper size restrictions and the like.

Figure 5:
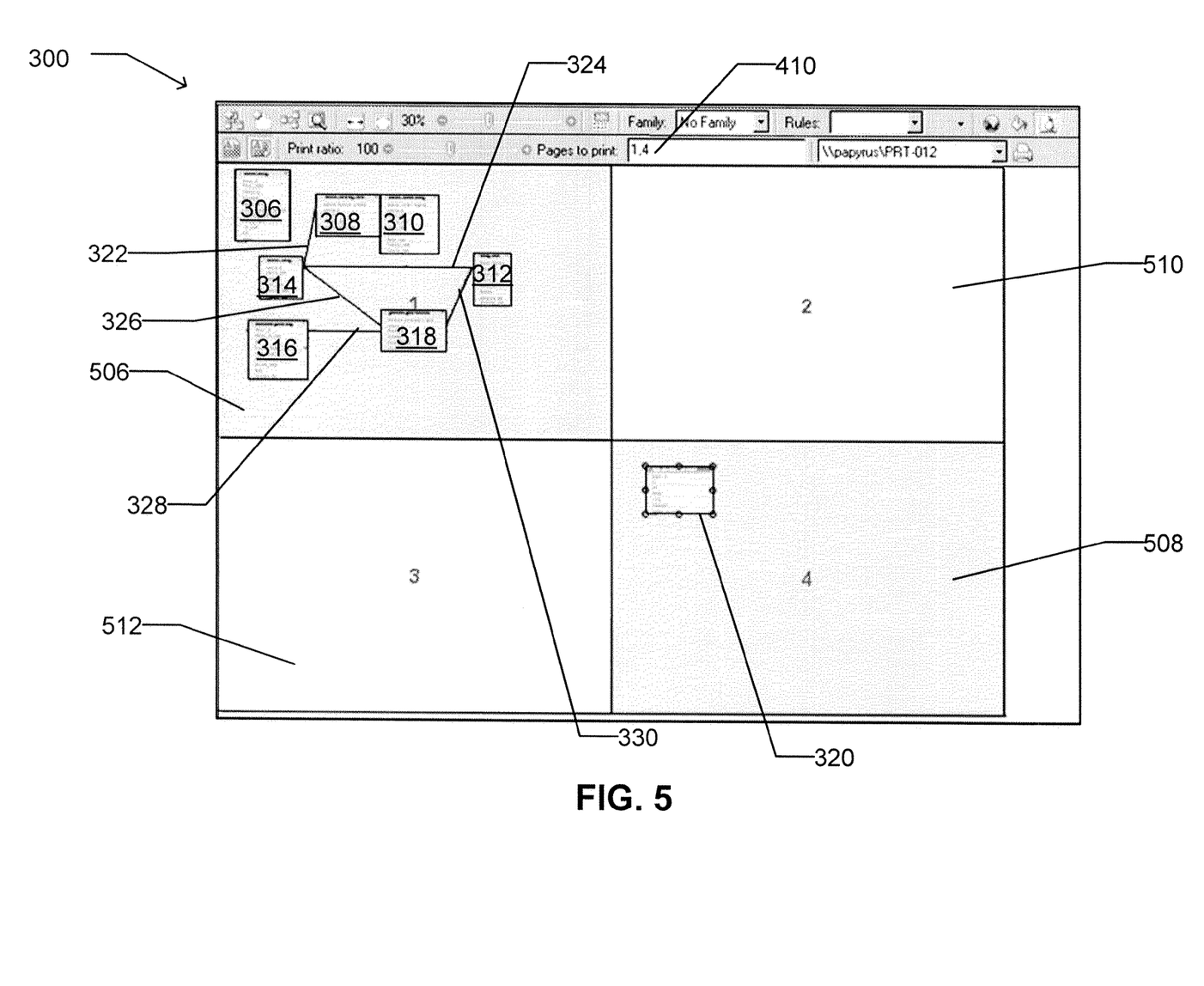
FIG. 5 illustrates the effect of editing the data modeling document in the print preview mode of FIG. 4 in accordance with an embodiment of the invention.

FIG. 5 illustrates the GUI 300 of FIG. 3. The data modeling objects 306-330 of FIG. 3 have been edited within the print preview mode, separating the table 320 from the remainder of the data modeling objects 306-318 and 322-330. The page layout has been updated to illustrate the four pages 506-512 required to print the entire document. Page 1 506 is highlighted as a page to print because it overlaps the data modeling objects 306-318 and 322-330. The page 4 508 is also highlighted to print because it overlaps the data modeling object 320. Page 2 510 and page 3 512 are not highlighted as pages to print because they do not overlap any data modeling objects. The "Pages to print" textbox 410 indicates the new page selection.

Figure 6:
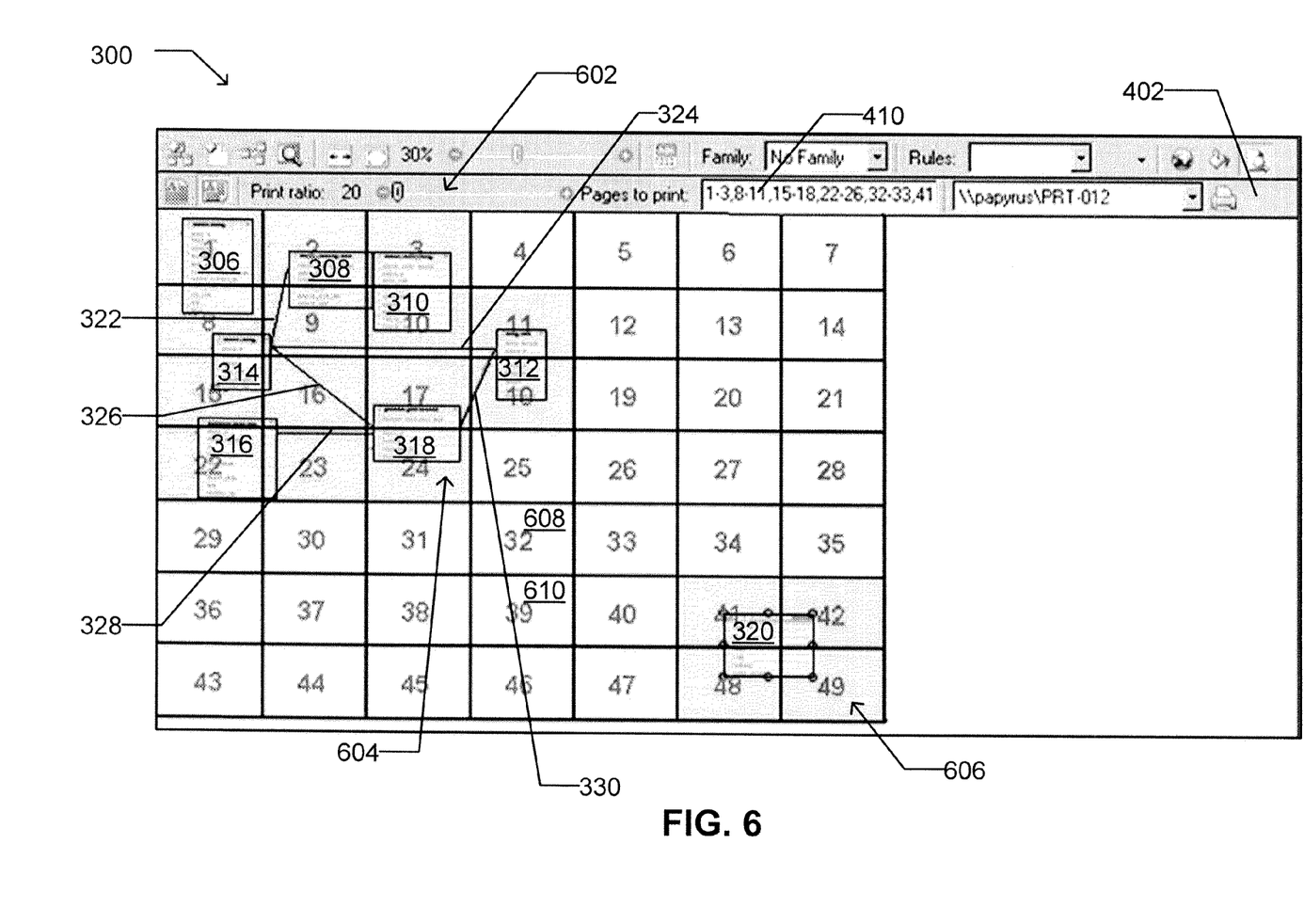
FIG. 6 illustrates the effect of altering the print ratio of the data modeling document in the print preview mode of FIG. 4 in accordance with an embodiment of the invention.

FIG. 6 illustrates the GUI 300 of FIG. 3 with a low print ratio. In an embodiment, the print preview toolbar 402 contains a "Print ratio" slider 602 which allows the user to alter the print ratio. In this example, the print ratio is set to 20% indicating that the printed document should be scaled to five times the size of the electronic document dimensions. The highlighted areas 604 and 606 are automatically selected for printing because their pages overlap the data modeling objects 306-318 and 322-330, and 320 respectively. In an embodiment, pages that are not automatically selected for printing, for example page 32 608 and page 39 610, can be added to the set of pages to print by clicking on the page or by adding the page number to the "Pages to print" textbox 410.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
   supply, in an editor mode, a first set of data modeling objects in a document, wherein the data modeling objects have a spatial relationship with respect to one another;
   accept a user request to enter a print preview mode;
   enter the print preview mode, while the editor mode remains active;
   overlay the document with a page layout comprising a set of pages, wherein the spatial relationship results in different data modeling objects appearing on different pages of the set of pages;
   designate a sub-set of pages of the set of pages to print; and
   print the sub-set of pages.

2. The computer readable storage medium of claim 1, wherein the sub-set of pages include selected data modeling objects appearing on different pages.

3. The computer readable storage medium of claim 1, wherein the executable instructions to supply include executable instructions to supply the first set of data modeling objects via user selection.

4. The computer readable storage medium of claim 1, wherein the executable instructions to supply include executable instructions to supply the first set of data modeling objects using a rule.

5. The computer readable storage medium of claim 4, wherein the rule selects a set of data modeling objects based on one or more components selected from name, data source, value and relationship.

6. The computer readable storage medium of claim 4, wherein the rule selects a set of data modeling objects based on type, wherein type is selected from one of comments, links, tables, aggregate tables, data tables, views, columns, rows, keys, data sources, cubes, measures, measure groups, attributes, dimensions, filters, transforms, logging points, mapping links, data flows, abstraction layers, data targets, rules, users, user groups and stored procedures.

7. The computer readable storage medium of claim 1, further comprising executable instructions to:
   accept a user alteration to one or more of the document and a set of print parameters; and
   update the page layout.

8. The computer readable storage medium of claim 7, further comprising executable instructions to:
   exit the print preview mode; and
   preserve the user alteration.

9. The computer readable storage medium of claim 7, wherein the set of print parameters are selected from page orientation, print ratio, printer, paper size, page-to-page ratio, number of copies, number of sides to print on, collation and pages to print.

10. The computer readable storage medium of claim 1, further comprising executable instructions to compile an overview page comprising at least three of an image indicating how the pages in the page layout should be aligned, a count of pages in the page layout, a document title, a document description, a selection rule definition, a timestamp, a date and a document author.

11. The computer readable storage medium of claim 1, wherein a data modeling object is selected from one or more of a table, a view, a comment, a link, a column, a row, a key, a data source, a cube, a measure, a measure group, an attribute, a dimension, a filter, a transform, a logging point, a mapping link, a data flow, an abstraction layer, a data target, a rule, a user, a user group and a stored procedure.

12. A computer readable storage medium, comprising executable instructions to:
supply data modeling objects in a document, wherein the data modeling objects have a spatial relationship with respect to one another;
accept a user request to enter a print preview mode;
enter the print preview mode while maintaining an active editor mode;
overlay a document with a page layout comprising a set of pages, wherein the spatial relationship results in different data modeling objects appearing on different pages of the set of pages;
accept a user alteration to a print ratio;
update the page layout; and
display the page layout.

13. The computer readable storage medium of claim 12, further comprising executable instructions to:
indicate a set of data modeling objects to print; and
indicate a sub-set of the set of pages to print, wherein a page in the sub-set of pages to print overlays a data modeling object.

14. The computer readable storage medium of claim 12, further comprising executable instructions to:
accept a user edit of one or more of the document and a set of print parameters; and
update the page layout.

15. The computer readable storage medium of claim 14, further comprising executable instructions to:
exit the print preview mode; and
preserve the user edit.

16. The computer readable storage medium of claim 12, wherein a first data modeling object is associated with a second data modeling object via properties contained within the first data modeling object.

17. The computer readable storage medium of claim 12, wherein a data modeling object is selected from one or more of a table, a view, a comment, a link, a column, a row, a key, a data source, a cube, a measure, a measure group, an attribute, a dimension, a filter, a transform, a logging point, a mapping link, a data flow, an abstraction layer, a data target, a rule, a user, a user group and a stored procedure.

18. The computer readable storage medium of claim 14 wherein the set of print parameters comprises one or more of page orientation, print ratio, printer, paper size, page-to-page ratio, number of copies, number of sides to print on, collation and pages to print.

* * * * *